(No Model.)
J. T. HALL.
CATTLE GUARD.
No. 403,532. Patented May 21, 1889.
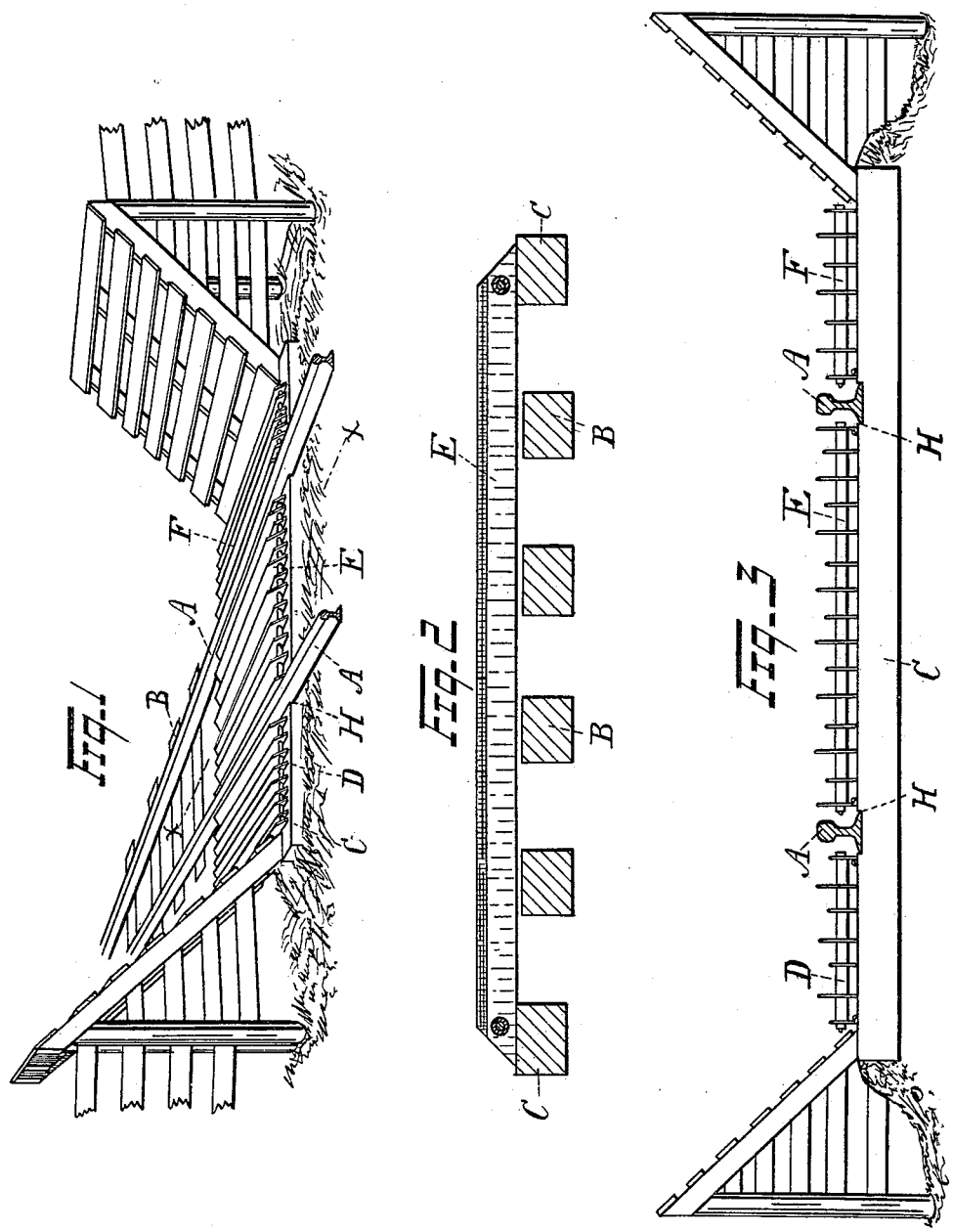
Witnesses:
John Schuman.
P. M. Hulbert.
Inventor:
James T. Hall
by Thos. S. Sprague & Son
Atty

UNITED STATES PATENT OFFICE.

JAMES T. HALL, OF ST. LOUIS, MICHIGAN.

CATTLE-GUARD.

SPECIFICATION forming part of Letters Patent No. 403,532, dated May 21, 1889.

Application filed October 29, 1888. Serial No. 289,363. (No model.)

*To all whom it may concern:*

Be it known that I, JAMES T. HALL, a citizen of the United States, residing at St. Louis, in the county of Gratiot and State of Michigan, have invented certain new and useful Improvements in Cattle-Guards, of which the following is a specification, reference being had therein to the accompanying drawings.

This invention relates to new and useful improvements in cattle-guards of that class wherein a surface obstruction adapted to destroy the footing of animals is secured at suitable points on the track; and my present improvement has especial reference to that construction in which the surface obstruction is formed by a series of parallel bars having an upward presentation of sharp edges—as, for instance, in a previous invention for which I was granted Letters Patent No. 390,592, dated July 11, 1888.

The principal object of this invention is to apply a new element of insecurity to this class of cattle-guards, whereby the footing for animals is still more effectually destroyed; and this consists in using bars of relatively thin and flexible band-iron, connecting them together in the form of a grating in the usual manner; but instead of supporting them on the sleepers of the track their entire length, or at short intervals, as now, supporting them only at long intervals, or preferably at the ends only, so that when an animal steps on such a guard its weight causes the bars, or a portion thereof, to vibrate or tremble on account of the flexibility of these bars and of their unsupported condition. By practical experience I have found that this new element of insecurity is most valuable in deterring cattle from crossing such guards, while at the same time it can be obtained without adding to the expense of the guard in any way or rendering it less durable.

A further object of my invention is to combine the guard with the side fences in such a manner that animals find it impossible to avoid the guard, while at the same time the fences do not form a dangerous obstruction, and are not liable to be broken down or drawn away from the cattle-guard to open access onto the track.

In the drawings which accompany this specification, Figure 1 is a perspective view of my improved cattle-guard as applied to a railroad-track. Fig. 2 is a vertical longitudinal section on line X X of Fig. 1. Fig. 3 is an end elevation.

A are the rails, and B the ordinary ties; C, the guard-supporting ties.

D, E, and F are the sections forming the cattle-guard, each composed of a series of bars of flexible band-iron transversely connected together in parallel relation to each other at equal distances apart to form a grating with the upward presentation of the edges of the bars, substantially as described and shown in the above-mentioned patent.

In the former construction of such cattle-guards the sections of grating have been supported upon the ties in such manner that each bar had a bearing upon all the ties underneath the guard, and as a consequence the bars were entirely rigid and the efficacy of the cattle-guard depended entirely upon the peculiar formation of the surface of the guard. In my present improvement, however, I support the guard in a different manner for the purpose of creating a new element of insecurity. To this end I use only a minimum of supports under the bars, and this I preferably accomplish with the use of two ties near the ends of the guard. These I raise above the level of the other ties, preferably by cutting notches H in them to form bearings for the rails on the same plane with the surface of the other ties, and upon these raised ties the ends of the cattle-guard are secured in any suitable manner. By this construction the bars of the guard are raised above the surface of the other ties, so that when cattle step upon them they will vibrate laterally and set the whole guard, or rather section, in a trembling motion, which, in connection with the peculiar form of surface afforded by the edges of the parallel bars, makes the device most effectual to deter animals from crossing.

The spirit of my invention will now be readily understood, and it will be seen that a similar result may be obtained by obvious modifications—such as, for instance, by using two raised ties nearer the center—which construction renders the ends more insecure, or the ties may be left undisturbed and a raised bearing be formed upon two or more ties to support the guard, or same ties may be lowered and the rails blocked thereon.

It has been the practice in constructing cattle-guards to build the side fences up close to the side of the track, terminating there with inclined ends to afford a sufficient opening for the passage of the locomotive and cars, the whole fence being secured to ground-posts, as in the usual construction of fences. This construction not only presents an insecure and doubtful barrier, but it is liable in course of time, under the influences of the heaving and settling of the ground, to open a passage for animals along the edge of the fences. To construct this part of the device to afford greater security, I have made the ties C of greater length than the ties forming the track. This serves two purpose—first, to give a sufficiently wide bearing to support the outer sections of the guard their entire length, and second to enable me to secure to the ends of these ties the posts of a section of inclined fence running the whole length of the cattle-guard, thus forming a continuous and substantial connection of the whole device from one fence to the other.

It is evident that other means may be devised than those shown in the drawings for clearing the guard from contact with the ties except at the points where it is secured—for instance, by lowering the intermediate ties, and putting necessary shims under the rails, instead of boxing the rail into the long ties; or it may be done by simply putting a strip under the guard at the points where it is secured to the tie, or other simple means may be devised for arriving at the same result; but I intend to cover in the spirit of my invention any means for arriving at the result described—for the purpose of effecting an insecurity to the footing by allowing the flexible bar to vibrate laterally.

It has been found impracticable to connect the sloping fence to a tie of regular length, because of the danger to the rolling-stock by such close proximity to the sloping fences. By extending the end ties I am enabled to avoid this difficulty, get a firm bearing for the sloping fences, and provide room for a section of the guard between the rails and said sloping fences.

What I claim as my invention is—

1. A railway cattle-guard of the kind described, composed of flexible bars set upon edge in the form of a grating and free to vibrate laterally, substantially as described.

2. A railway cattle-guard of the kind described, composed of flexible bars set up on edge lengthwise of the track and connected at their ends only in sections in the form of gratings and supported by raised ties under the ends, substantially as described.

3. The combination, with the ties extended as described, of sloping side fences having their posts secured directly to the extended ends of said ties, substantially as and for the purpose specified.

4. The combination, with the rails and ties, of the guard between said rails, the extended ties supporting the ends of said guard, the sloping side fences secured to the ends of said extended ties, and a section of guard between the rail and the side fences, substantially as shown and described.

In testimony whereof I affix my signature, in presence of two witnesses, this 4th day of September, 1888.

JAMES T. HALL.

Witnesses:
P. M. HULBERT,
JOHN SCHUMAN.